No. 831,333. PATENTED SEPT. 18, 1906.
A. H. FETTERS.
CAR BOLSTER SIDE BEARING.
APPLICATION FILED NOV. 8, 1905.
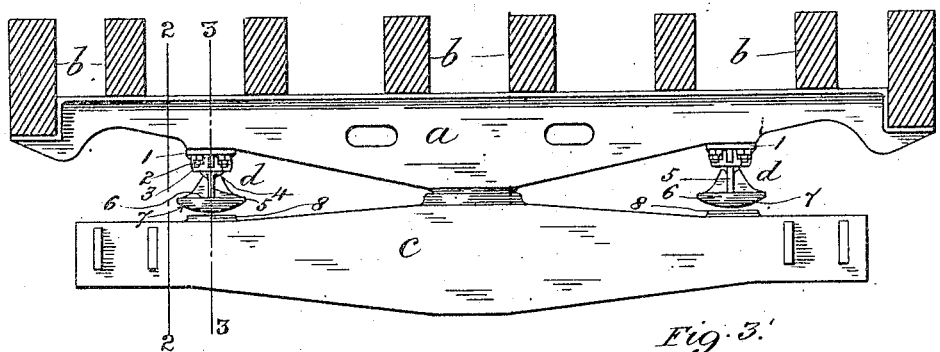
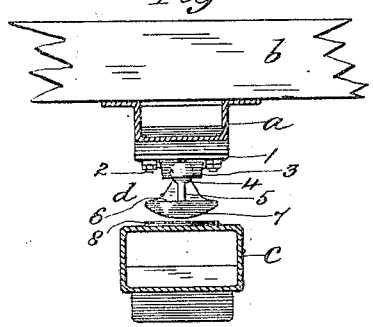
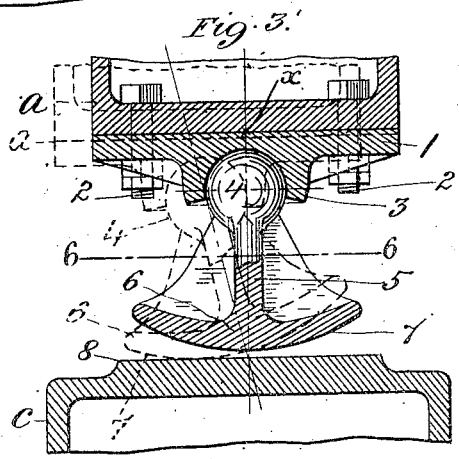
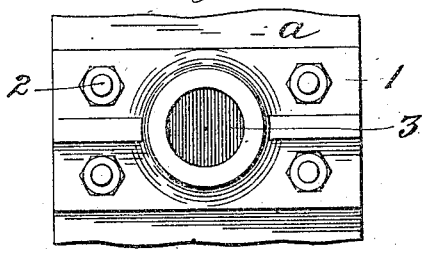
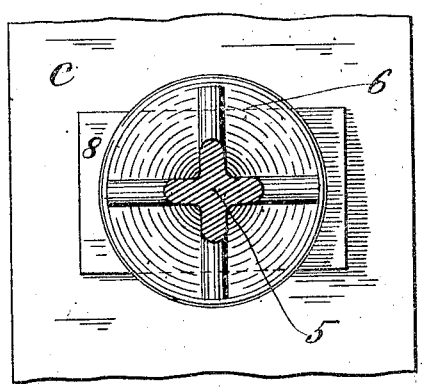
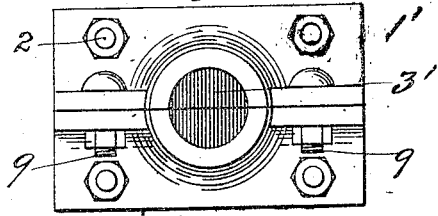
WITNESSES
J. W. Benbow
O. T. Ledford
INVENTOR
Arthur H. Fetters
By Edward W. Furrell
His Atty

UNITED STATES PATENT OFFICE.

ARTHUR H. FETTERS, OF OMAHA, NEBRASKA.

CAR-BOLSTER SIDE BEARING.

No. 831,338.    Specification of Letters Patent.    Patented Sept. 18, 1906.

Application filed November 8, 1905. Serial No. 286,358.

*To all whom it may concern:*

Be it known that I, ARTHUR H. FETTERS, a citizen of the United States, residing at Omaha, in the county of Douglas and State of Nebraska, have invented a new and useful Improvement in Car-Bolster Side Bearings, of which the following is a specification.

My invention relates to the side bearings of a car-body bolster and combined truck-bolster, and has for its object to provide a self-centering side bearing of simple construction and movable in all directions of motion of the car-body relatively to the truck.

The invention consists in features of novelty, as hereinafter described and claimed, reference being had to the accompanying drawings, forming part of this specification, whereon—

Figure 1 is a side elevation of a car-body bolster and combined truck-bolster having my improved side bearings; Fig. 2, a cross-section through the bolsters on line 2 2 in Fig. 1; Fig. 3, a similar view through the bolsters and one of the side bearings on line 3 3 in Fig. 1; Fig. 4, an inverted plan of the socket and base-plate thereof forming part of the side bearing and fixed to the under side of the body-bolster, (broken away;) Fig. 5, a modification of the same; and Fig. 6 a horizontal section through the side bearing on line 6 6 in Fig. 3, showing the bearing-surface therefor on the truck-bolster, (broken away,) seen in top plan.

Like letters and numerals of reference denote like parts in all the figures.

$a$ represents a body-bolster fixed to the sills $b$ of the car-body and centrally pivoted on the truck-bolster $c$ in the usual well-known manner.

$d$ represents the side bearings, which consist, respectively, of preferably a plate 1, fixed to the under side of the body-bolster $a$ by bolts 2 or otherwise at the usual distance of the side bearing $d$ from the center of the bolster $a$ and formed on its under side with a socket 3, having its mouth or opening downward and in which is fitted and adapted to be partially rotated in every direction a ball 4, or, if desired, the socket 3 may be made integral with the body-bolster $a$ and the plate 1 dispensed with.

From the ball 4 projects a shank 5, which is formed or provided at its free end with a preferably circular head or block 6, having its outer portion 7 spherical-shaped and described from a center $x$, which is alined to the center of the ball 4 and to the longitudinal center line of the shank 5, the radius of the spherical portion 7 being somewhat greater than that of its vibration from the ball 4 within the socket 3.

In the normal position of the ball 4 within the socket 3 the shank 5 depends vertically therefrom, with the central point of the spherical portion 7 of the head 6 clear of the bearing-surface 8, which is formed therefor on the truck-bolster $c$.

In operation on the lurching of the car-body and the angular movement of the body-bolster $a$ about its central pivot into the position indicated by dotted lines in Fig. 3 consequent upon the truck-bolster traveling round a curve of the rail-track the spherical portion 7 of the side bearing $d$ is lowered into contact with and rolls along the bearing-surface 8 of the truck-bolster $c$ into the position indicated by the dotted lines, whereby owing to the radius of the spherical surface 7 being greater than that of its vibration with the head 6 from the socket 3 the body-bolster $a$, with the car-body, is somewhat lifted, so that when the truck-bolster $c$ leaves the curve on the rail-track and returns to its original position the side bearing $d$ is returned to its normal or middle position by gravity, due to the weight of the car-body and bolster $a$, or, in other words, by my improved construction the side bearing $d$ is rendered self-centering in whatever position the car-body bolster $a$ may move relatively to the car-track.

The socket 3, as shown in Figs. 1, 2, 3, and 4, is preferably integral with the base-plate 1, the ball 4 being held therein in the dependent position of its shank 5 by closing the edge portion of the socket 3, surrounding its mouth or opening against the ball 4 below the center of the latter; but, if desired, the socket 3', with its base-plate 1', may be made in halves, respectively flanged and secured together by bolts 9, as shown in Fig. 5, whereby the closing of the edge of the socket 3' is avoided. Furthermore, if desired, the outer surface 7 of the side bearing $d$ in lieu of being spherical may be convex transversely to the truck-bolster $c$ and straight longitudinally thereto, and the head 6 in lieu of being circular radially to the center of the shank 5, as shown, may be rectangular or other suitable shape.

What I claim as my invention, and desire to secure by Letters Patent, is—

In a car-bolster side bearing, the combination with the body-bolster and the truck-bolster, of a socket fixed to the under side of the body-bolster, a ball pivotally connected to the socket and having a shank, the said ball being radially movable within the socket, and a head on the free end of the shank, the said head having its outer portion spherical and described from a center alined to the center of the ball, and to the longitudinal center line of the shank, for bearing on the truck-bolster, the radius of the said portion being greater than that of its vibration from the said ball and socket, substantially as described and for the purpose set forth.

In testimony whereof I have signed my name to this specification in the presence of two subscribing witnesses.

ARTHUR H. FETTERS.

Witnesses:
EDMUND B. DAILEY,
ANDREW E. WEEKUP.